Figure 1:
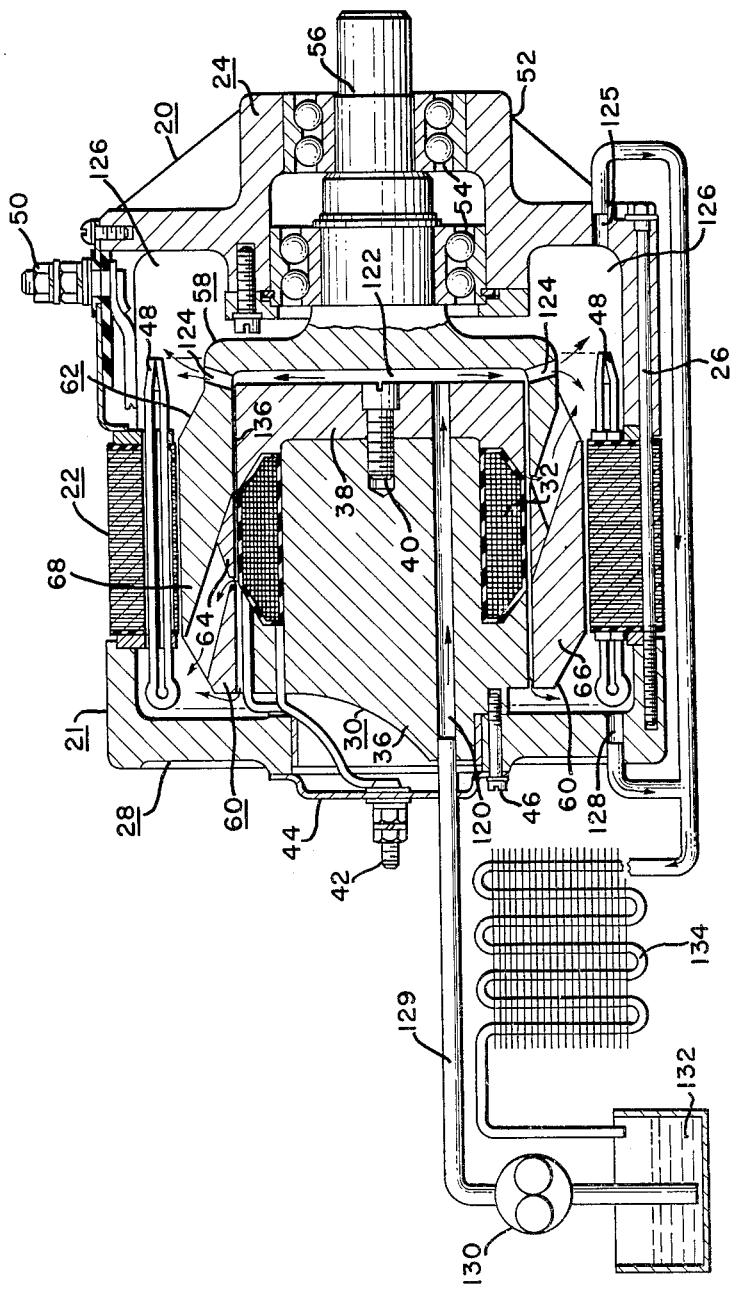

INVENTORS
Ralph H. Bertsche
Eldred E. Gegenheimer
Their Attorney

INVENTORS
Ralph H. Bertsche
Eldred E. Gegenheimer
BY
Their Attorney

United States Patent Office 2,987,637
Patented June 6, 1961

2,987,637
DYNAMOELECTRIC MACHINE
Ralph H. Bertsche, Royal Oak, and Eldred E. Gegenheimer, Clawson, Mich., assignors to General Motors Corporation, Detroit, Mich., a corporation of Delaware
Filed Sept. 11, 1957, Ser. No. 683,383
5 Claims. (Cl. 310—54)

This invention relates to alternating current generators and more particularly to brushless type alternators. This application is a continuation-in-part of our copending application Ser. No. 589,759, filed June 6, 1956, now Patent 2,928,963.

It is an object of this invention to provide an alternating current generator wherein the exciting field winding of the generator is stationary and wherein a voltage is induced in a second stationary winding, thus eliminating the need for brushes, slip rings or other types of devices which conduct electrical current between stationary and moving parts.

Another object of the present invention is to provide an alternator having stator and field windings and a magnetic pole assembly, the latter being so constructed that when it is rotated between the stator and field windings an alternating voltage is induced in the stator winding.

A further object of the present invention is to form the magnetic pole assembly of two sections of magnetic material and to space and secure these parts together with a part of non-magnetic material.

Another object of the present invention is to provide an oil cooling arrangement for an alternator of the type described. This object is preferably accomplished by feeding cooling oil to a point located between the stationary field and the magnetic pole assembly of the generator whereby the magnetic pole assembly centrifugally forces the oil onto the stator windings of the generator. In this way, both the stator winding and field winding are cooled by circulating oil.

In carrying out the above objects, it is a further object of the present invention to mount the stator and field windings in the flywheel housing of an internal combustion engine and to mount an assembly of magnetic material on the flywheel of the engine so that the magnetic assembly will rotate between the stator and field windings.

Further objects and advantages of the present invention will be apparent from the following description, reference being had to the accompanying drawings, wherein a preferred form of the present invention is clearly shown.

Figure 2:
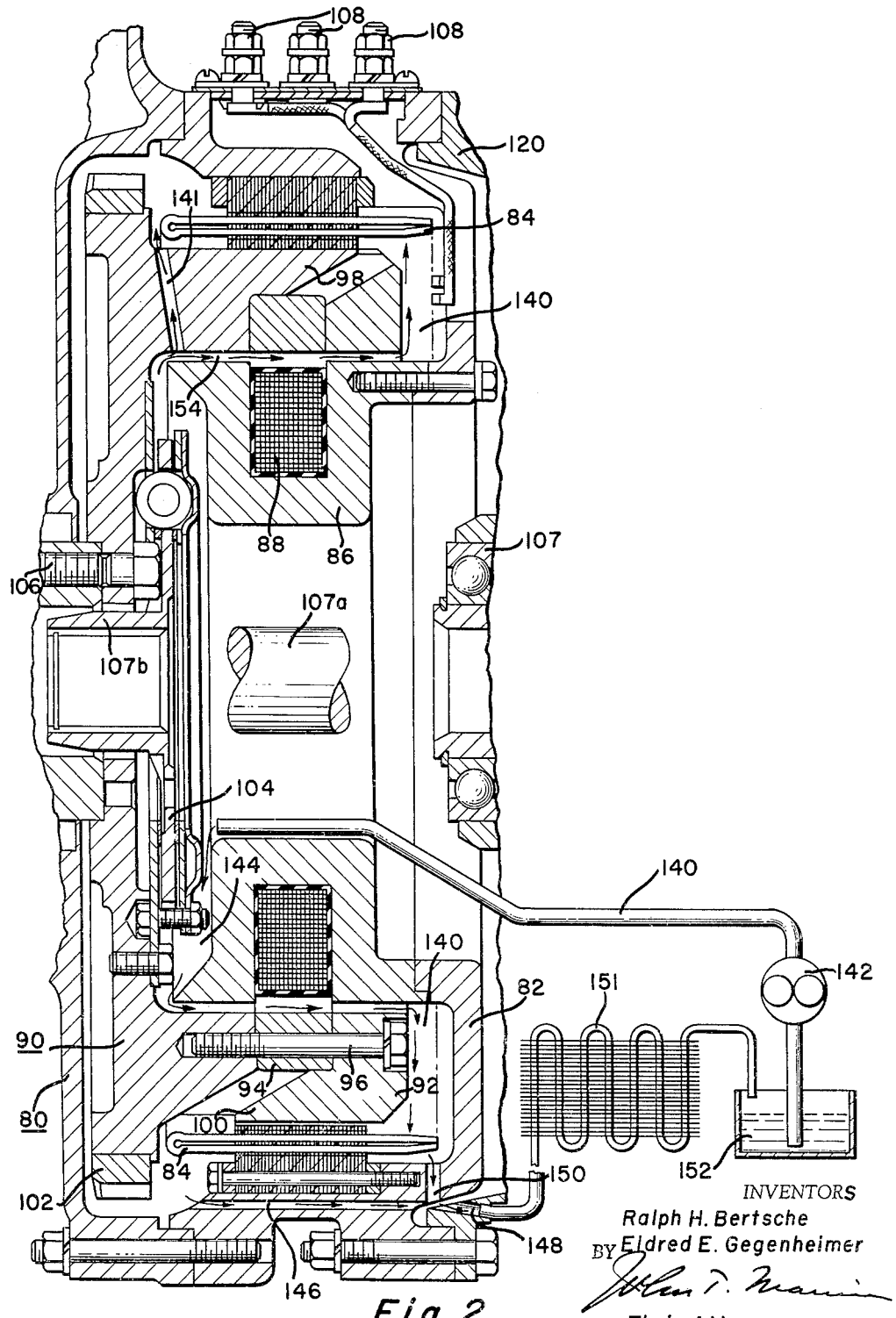

In the drawings:

FIGURE 1 is a view, partly in section, showing an alternator made in accordance with this invention that is provided with an oil cooling arrangement; and FIGURE 2 is a view, partly in section, showing an oil cooling arrangement for an alternator made in accordance with this invention.

Referring now to the drawings, and more particularly to FIG 1, the components of the alternator 20 according to the present invention, are shown. These components include an end frame and field assembly 21, a stator assembly 22, and a drive end frame and magnetic pole assembly 24. These assemblies are secured together, as shown by bolts 2 or other means.

The end frame and field assembly 21 for the alternator 20 includes an end frame 28, a magnetic core 30, and a field winding 32. The core 30 is preferably formed of two parts, 36 and 38. These parts are formed as shown to hold the field coil winding 32 in position when parts 36 and 38 are secured together by a bolt 40. The parts 36 and 38 are shaped and arranged to provide two oppositely facing, generally U-shaped members. The ends of the field coil winding 32 extend through suitably located slots in part 36 to the end frame 28 where they are secured to the terminals 42. The terminals 42 are secured to an end cover plate 44 which is held in position on the frame 28 by bolts 46 which also secure the magnetic core 30 on the end frame 28.

The stator assembly 22 includes the stator windings 48 which are held in position in slots in the magnetic iron of the stator, as is well known to those skilled in the art. The stator 22, has a 3-phase winding 48 which is connected to terminals 50. The stator winding may be for other than 3-phase and may be connected in any of the usual ways, as for example, Y or delta.

The drive end frame and magnetic pole assembly 24 includes an end frame 52, bearings 54 and rotor assembly 58. The end frame 52 carries the bearings 54 which support the rotor assembly 58 in the air gap between core 30 and stator 22. Rotor assembly 58 is composed of shaft 56 and parts 60 and 62. The shaft may be integrally formed with part 62 or be secured thereto by shrink fit, brazing, welding or other means. Parts 60 and 62 are of magnetic material and held in spaced relation with each other by an annular spacer 64 of suitable cross section and of non-magnetic material such as stainless steel or bronze. Parts 60, 62 and 64 may be secured together by welding, brazing, non-magnetic bolts or other means.

The parts 60 and 62 each have finger-like projections, denoted respectively by reference numerals 66 and 68. The fingers of one part are interleaved with the fingers of the other part and the fingers are spaced from one another. The fingers of one part also extend in an opposite direction from the fingers of the other part and all of the fingers rotate in the space between the field core 30 and the stator core when the rotor assembly is rotated by shaft 56.

In operation, field winding 32 is connected to a suitable source of D.C. voltage. The current in winding 32 produces magnetic flux in core 30. The flux produced passes from core 30 to part 38, crosses the inner air gap into part 62 and then to the fingers 68. It then crosses the outer air gap, entering the stator 22 through those stator teeth adjacent to fingers 68. The flux then travels circumferentially in the stator iron one pole pitch and returns through other stator teeth across the outer air gap to fingers 66. The flux return path is completed through part 60 of the rotor, the inner air gap, part 36 and again to core 30. The magnetic polarity of core 30 and fingers 66 and 68 once established by the current in winding 32 remains the same. Turning of the rotor 58 through one pole pitch reverses the flux direction in any given part of the stator iron. Continued reversals of flux in the stator caused by continuous turning of the rotor generates an A.C. voltage in the stator winding 48. The cross sectional area and length of the iron paths and air gaps to be traveled by the flux, and hence the reluctance of the magnetic circuit remain essentially constant during rotation of the rotor assembly 58. The operation of this alternator is similar to a salient pole machine but no brushes or slip rings are necessary. Moreover, the alternator as disclosed needs bearings at only one end to support the rotating magnetic pole assembly.

In FIG. 2 of the drawings, an arrangement is shown whereby the alternator according to the present invention may be mounted within the flywheel housing of an internal combustion engine. In this embodiment, the flywheel housing 80 supports the stator 82 which includes stator winding 84 and supports U-shaped field iron 86 which supports the field coil windings 88. The magnetic pole assembly preferably serves as a portion of the flywheel for the engine and is formed of parts 90 and 92 which are held spaced from each other by a non-magnetic part 94. The parts 90, 92 and 94 are secured to each other by a plurality of radially located bolts 96 which are of non-magnetic material. The parts 90 and 92 form a cup-shaped annulus and each have spaced fingers 98 and 100 which are spaced from each other. The part 90 may also support a ring gear 102 which is used in connection with the engine starting apparatus and a flexible coupling 104. The part 90 is secured to the engine drive shaft by means of radially located bolts 106. The end connections for the field windings 88 and the starter windings 84 are preferably passed through suitable slots where they are connected with terminals 108 that are carried by the flywheel housing. From the foregoing, it is manifest that a very compact unit is provided which may be readily enclosed within the flywheel housing. This unit will have the required output to satisfy the demands of the vehicle wherein it is included and may be wound in a manner well known to those skilled in the art and be of the single or multiple-phase types having either Y or delta connected stator windings. The bearing 107 is supported by a transmission housing and journals a drive shaft 107a which transmits the engine power. This drive shaft preferably has a splined connection with part 107b which is driven through the flexible coupling by part 90. In this connection, it is to be noted that the shaft, field iron 86, rotor parts 90 and 92, and stator 82 are coaxial and concentric.

Field winding 88, as shown, is one coil and is connected to terminals 108. It is to be understood that the winding may consist of two or more coils with additional terminals, if necessary. The coils may be used in an adding or subtracting relationship, as desired. Such an arrangement is sometimes an aid to regulation of output voltage. In the alternator being described, these additional or control field windings may be employed without slip rings or brushes.

The core 30 in the embodiment of FIG. 1 is provided with an axially extending passage 120 that communicates with a space 122 located between part 62 of the rotor and part 38 of the field core assembly. The part 62 of the magnetic pole assembly or rotor is formed with a plurality of substantially radially extending passages 124 which place the space 122 in communication with the annular space 126. The housing of the alternator is formed with passages at 125 and at 128, the purpose of which will be described hereinafter. The passage 120 is connected with a pipe 129 which is in turn connected with the outlet of a pump 130. The inlet of pump 130 is connected with a sump 132 which is supplied with oil by a pipe that is connected with an oil cooler 134. The passages 125 and 128 are connected by piping, as shown, to an opposite side of the oil cooler 134. If desired, only one outlet passage need be used instead of the two passages 125 and 128 and this passage could be located at either 125 or 128.

With the arrangement just described, oil is forced under pressure through pipe 129 into passage 120 and then into the space 122. With the magnetic pole assembly rotating, the oil is thrown centrifugally through passages 124 onto the right ends of stator windings 48. Oil also passes through the air gap 136 formed between the rotor and the field core of the alternator. This oil flows axially along the air gap and is thrown around the left end of the rotor onto the left ends of stator windings 48. Some oil may also escape through the rotor assembly between the fingers 68 and 66 around the annular spacer 64. The oil, after cooling the stator windings 48, finds its way to passages 125 and 128 where it is exhausted to the oil cooler 134 and the sump 132. The rotation of the rotor assembly provides for efficient splashing of the stator winding with cooling oil, and the particular oil flow arrangement provides for cooling of the field winding 32 by oil that passes axially along air gap 136. It is noted that in the construction of FIG. 1, the end frame 28 is entirely closed.

The generator of FIGURE 2 is oil cooled. In FIG. 2, a stationary pipe 140 is connected to the outlet of a pump 142. The open end of pipe 140 is connected so as to supply oil to an annular space 144 formed between the field core of the alternator and the rotor of the alternator. The rotor of the alternator is provided with a plurality of radially extending passages 141 which provide for communication between the annular space 144 and the left end of stator winding 84. The stator iron is also provided with an axially extending passage 146 which provides for communication between the left end of stator winding 84 and an outlet passage 148. Another outlet passage 150 is connected so as to place the outlet passage 148 in communication with the area immediately adjacent the right end of stator winding 84. The outlet passage 148 is connected by means of a pipe to an oil cooler 151 which, in turn, exhausts into a sump 152. The sump is connected to the inlet side of oil pump 142.

With the arrangement just described, oil is pumped into the annular chamber 144. With the rotor rotating, the oil is forced through radially extending passages 141 and contacts the left end of stator winding 84. Oil also flows in the air gap 154 formed between the rotor assembly and fixed field assembly. This oil flows around the right end of the rotor assembly to contact the right end of stator winding 84. The oil may also flow outwardly from the air gap 154 between the fingers of the rotor assembly and onto the stator winding 84. The oil, after cooling the stator winding, finds its way to outlet passages 148 and 150 and is exhausted to the sump 152 via oil cooler 151.

Oil cooling of an alternator possible with the brushless machine herein described is much to be preferred over the conventional air cooling. Heat transfer to the oil is more efficient and there is less likelihood of dangerous hot spots. The passages in an air cooled machine frequently become obstructed with lint, dirt or other material seriously reducing air flow. Filters to keep dirt out are expensive and are usually poorly maintained, resulting in restricted air flow and overheating. Water splash and agents used for cleaning the machine damage the insulation. Enclosing the machine and circulating oil through it in a closed system provides better cooling and overcomes the difficulties that accompany air cooling.

Installations are frequently made in which the alternator is flange mounted to the engine and driven by a gear or coupling. The engine crankcase oil may then be used for cooling without shaft seals and lubrication is automatically provided for the bearings. In other installations separate oil circulation systems may be used.

While the form of embodiment of the invention is herein disclosed constitutes a preferred form, it is to be understood that other forms might be adopted, as may come within the scope of the claims which follow.

What is claimed is as follows:

1. A dynamoelectric machine comprising, a housing, a fixed field assembly including a field winding located within said housing, a generally cup-shaped rotor rotatable within said housing and partially enclosing said field assembly with the sidewalls of the rotor being spaced from the field assembly to form an annular air gap and with the end wall of the rotor being spaced from one end of the field assembly to form a transversely extending space communicating with said annular air gap, a stator winding encircling said rotor, a plurality of generally radially extending passages in said rotor connecting said transversely extending space with a space located adjacent a portion of said stator winding, and means connecting said transversely extending space with a source of liquid cooling medium, said cooling medium passing into said annular air gap from said space and into the area containing said stator winding through said radially extending passages.

2. A dynamoelectric machine comprising, a housing, a fixed field assembly including a field core and a field winding located within said housing, a rotor assembly comprising interleaved fingers of magnetic material separated by a member of non-magnetic material and shaped to form a cylinder having one open end, said rotor assembly at least enclosing said field assembly and spaced therefrom to form an annular axially extending air gap and a transversely extending space communicating with said annular air gap, a stator winding surrounding said rotor assembly, a plurality of spaces defined by said fingers connecting said air gap and the area in which at least a portion of said stator winding is positioned, means including inlet passage means passing through said field assembly for supplying a liquid cooling medium to said transversely extending space, said cooling medium passing through said spaces to contact said stator winding, an outlet for said cooling medium, and pump means connecting said outlet and said inlet passage means.

3. The dynamoelectric machine according to claim 2 wherein said rotor assembly has radially extending passages connecting another area containing at least another portion of said stator winding with said annular air gap.

4. A dynamoelectric machine comprising, a housing, a fixed field assembly including a field winding located within said housing, a generally cup-shaped rotor rotatable within said housing and partially enclosing said field assembly with the side walls of the rotor being spaced from the field assembly to form an annular air gap and with the end wall of the rotor being spaced from one end of the field assembly to form a transversely extending space communicating with said annular air gap, a stator winding encircling said rotor, a plurality of generally radially extending passages in said rotor connecting said transversely extending space with a space located adjacent at least a portion of said stator winding, and passage means passing through said field assembly connecting said transversely extending space with a source of liquid cooling medium.

5. A dynamoelectric machine comprising, a housing, a fixed field assembly including a field winding located within said housing, a generally cup-shaped rotor including magnetic parts having spaced interleaved fingers rotatable within said housing and at least partially enclosing said field assembly, the side walls of said rotor being spaced from the field assembly to form an annular air gap and the end wall of the rotor being spaced from one end of the field assembly to form a transversely extending space communicating with said annular air gap, a stator winding encircling said rotor, and passage means passing through said field assembly connecting said transversely extending space with a source of liquid cooling medium, said cooling medium passing through said annular air gap from said transversely extending space and thence onto said stator winding through spaces defined by said fingers to effectively cool both said field winding and stator winding.

References Cited in the file of this patent

UNITED STATES PATENTS

| | | |
|---|---|---|
| 2,409,557 | Gilfillan | Oct. 15, 1946 |
| 2,428,634 | Nordstrum | Oct. 7, 1947 |
| 2,796,542 | Beckley | June 18, 1957 |

FOREIGN PATENTS

| | | |
|---|---|---|
| 589,840 | Great Britain | June 1, 1947 |
| 614,091 | Great Britain | Dec. 9, 1948 |
| 644,192 | Great Britain | Oct. 4, 1950 |